Patented July 24, 1951

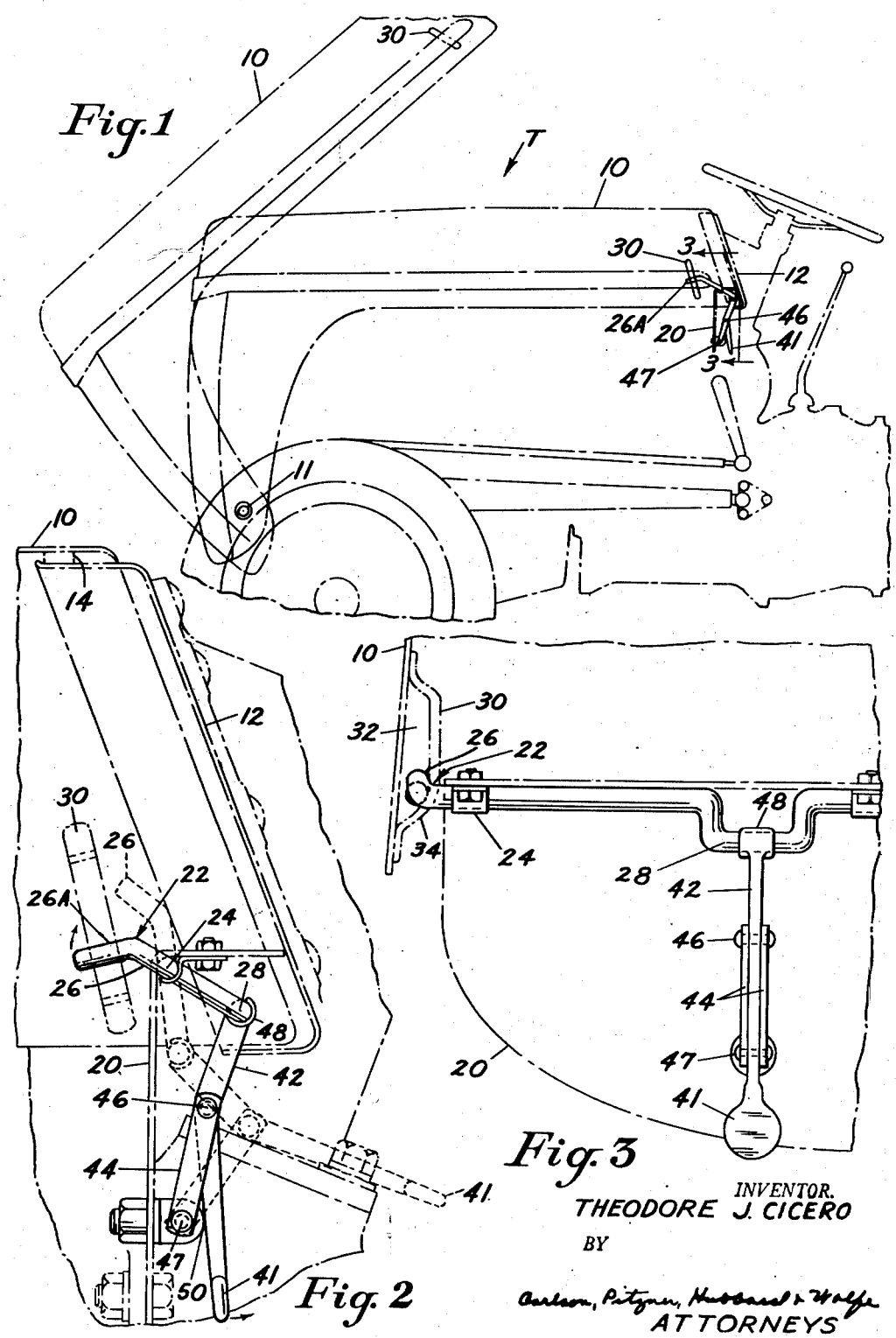

2,561,496

UNITED STATES PATENT OFFICE 2,561,496

HOOD LOCK

Theodore J. Cicero, Detroit, Mich., assignor to Harry Ferguson, Inc., Detroit, Mich., a corporation of Delaware Application July 3, 1948, Serial No. 36,862

2 Claims. (Cl. 292—117)

The present invention relates to tractors and more particularly to a hood lock for use thereon.

It is the aim of the present invention to provide an improved hood lock for a tractor which is positive in operation, simple and inexpensive of construction, and easy to operate. In a more detailed aspect it is an object to provide a hood lock which serves simultaneously to grip each side of the hood in locking engagement and which is so constructed that the hood cannot jar loose upon passage of the tractor over rough terrain. Other objects and advantages of the invention will become apparent as the description proceeds taken in connection with the accompanying drawings, in which:

Figure 1 is a side elevation showing a hood lock constructed in accordance with the present invention installed on a tractor, the tractor being set forth merely in dot-dash outline.

Fig. 2 is a detailed view of the construction of the hood lock, only a fragmentary portion of the tractor being shown.

Fig. 3 is a fragmentary section taken along the line 3—3 of Fig. 1.

While the invention is susceptible of various modifications and alternative constructions I have shown in the drawing and will herein describe in detail one embodiment of the invention. It is to be understood, however, that I do not intend to limit the invention by such disclosure, but aim to cover all modifications and alternative constructions falling within the spirit and scope of the invention as expressed in the appended claims.

Referring now to the drawings the tractor T shown in Figure 1 will be recognized as a tractor of well known commercial design having a generally L-shaped hood 10 which is pivoted on the tractor at a pivot 11 located generally above the tractor front wheels. As is conventional, the hood is arch-shaped in transverse section and is adapted to be supported at its rear end by straddling the dashboard 12 of the tractor. The latter is firmly mounted to the tractor by means not shown and carries a peripheral gasket 14 (Fig. 2) which is sandwiched between the hood and dashboard to prevent rattling at the joint.

In accordance with the invention an improved hood lock is provided utilizing toggle action not only to enable the operator to exert a powerful leverage to clamp the hood securely into position, but also to prevent reverse action of the locking member under shock and vibration. To mount the mechanism a bracket 20 is provided which is securely fastened to the tractor and preferably anchored to the dashboard 12. In the present embodiment the bracket 20 serves to rockably mount a crank-like locking member indicated generally at 22 and which is pivoted at 24 about an axis extending transversely of the tractor. Such locking member 22 includes locking arms 26 at each end thereof and an offset crank portion 28 at its center serving as an operating arm. Only one of the locking arms 26 is shown since it will be understood that this portion of the mechanism is duplicated at each side of the tractor hood.

The locking arms 26 preferably engage respective hold-down clips 30 which are generally U-shaped and welded along the inside of the trailing portion of the hood. Such clips provide a more or less rectangular aperture 32 for the reception of the arms 26. The lower portion of the hold-down clip 30 is preferably tapered or sloped downwardly as shown at 34 so that wedging engagement with the associated locking arm 26 occurs toward the latter portion of the range of movement of the arm. Preferably also, the ends of the locking arms 26 are bent over as shown at 26a to provide a modified hook portion. When in the locking position illustrated in Fig. 2, the hook portion 26a is preferably at about right angles to the longitudinal dimension of the hold-down clip 30.

In accordance with one of the more detailed aspects of the invention, a toggle is provided for engagement with the offset crank portion 28 to cause a fore and aft rocking movement of the locking arms 26, the toggle being so arranged as to be on dead center position when the locking arms are in locking position. In the present instance such toggle comprises two vertically arranged links, an upper link 42 and a lower link 44 interconnected by a pivot 46. The lower link is anchored to the tractor by a pivot 47 while the upper link is attached to the offset crank portion 28 by a sleeve joint 48.

To operate the linkage described above the upper link has a handle 41 rigidly connected thereto, the handle in the present instance constituting an integral extension projecting downwardly and rearwardly from the link. Swinging of the handle rearwardly into the position shown dotted in Fig. 2 causes movement of the central pivot point to the right and consequent breaking of the toggle 42, 44 in the same direction. As a result the link 42 is rotated relative to the tractor, causing the locking arms 26 to swing clockwise and out of engagement with the hold-down clips 30. This enables the tractor hood 10 to be toppled forwardly about its pivot 11 to enable access to the engine and associated parts.

The operation of locking is equally simple. The tractor hood 10 is swung down into its normal position and the operating handle 41 is pushed downwardly from the dotted position to that shown in full in Fig. 2. This causes successive straightening of the toggle linkage 42, 44 and results in a powerful counterclockwise torque being applied to the locking arms 26, the outer end portion of which is forced into increasing wedging engagement with the hold-down clips 30. As will be appreciated by one skilled in the art, such torque greatly increases toward the end of the stroke and as the dead-center condtion is reached. This arrangement is particularly effective for applying torque to the locking arms since under dead-center conditions the line of action of the toggle makes substantially a right angle with the offset crank 28. Movement appreciably beyond dead center is prevented by reason of the operating handle striking an abutment 50 formed by the pivotal mounting 47 for the lower link. It will be apparent upon inspection of Fig. 2 that when the handle is in its normal locking position it is completely out of the way below the dashboard of the tractor.

It is of interest to review the operation of the lock under conditions tending to jar the hood upwardly. It will be apparent from Fig. 2 that any tendency toward upward movement is resisted by reason of the toggle being on dead-center position. Preferably the operating handle 41 is so oriented with respect to the link 42 and the abutment 50 is of such height as to cause the toggle 42, 44 to be slightly beyond the dead-center condition, as shown. This produces a self-locking action since any attempted reverse (clockwise) swing of the locking arms 26 merely causes the toggle to lock more firmly since the resilient force exerted by the wedging action of the hold-down clips 30 against the locking arms increases as the dead-center position is approached.

Field experience has shown that the hood lock disclosed herein is practically indestructible. One of the common causes of failure of conventional locks results from attempted closure of the hood when the locking arms are not positioned to receive it. For example, it is conceivable that one may attempt to close the hood with the locking arms 26 in the position shown in full in Fig. 2. The resulting interference between the lower side of the hold-down clip 30 and the end portion 26a of the locking arm causes a counterclockwise torque to be applied to the latter. The result of such torque in the present construction is merely to straighten the toggle 42, 44. And, since the toggle under the conditions named is already fully extended, it will be apparent that no further action can take place. Assuming that a sturdy crank rod is employed, no part of the mechanism will be subject to damage.

What is claimed is:

1. In a tractor having a hood arranged for upward swinging movement into open position, said hood having a hold-down clip with a downwardly tapered lower portion, a hood lock comprising in combination, a crank rod mounted on said tractor for rotation about a transverse axis, said crank rod having an offset crank portion, an operating toggle consisting of upper and lower links having their adjacent end portions pivotally interconnected, said upper link being pivotally connected to said crank portion adjacent its upper end, said lower link having its lower end pivotally connected to said tractor, a rigid extension on said upper link for moving said toggle into and past dead-center position, a locking arm on said crank arm positioned thereon to move into resilient increasing wedging engagement with the tapered lower portion of said hold-down clip upon moving said toggle toward the dead-center position, said rigid extension on said upper link being angled downwardly and rearwardly relative to the latter such that said extension lies substantially adjacent said lower link and abuts the pivotal connection on the lower end of said lower link upon moving said toggle slightly forward of the dead-center position of said toggle.

2. In a tractor having a hood arranged for forward and upward swinging movement, a hood lock comprising a rigid crank pivotally mounted on said tractor, said crank having a locking arm and an operating arm, a U-shaped hold-down clip on said hood providing an aperture for receiving said locking arm, the lower portion of said clip being tapered downwardly for wedginly engaging said locking arm, a toggle having rigid first and second links pivoted together at their inner end portions, the first of said links having its outer end portion pivotally connected to said operating arm, the second of said links having its outer end portion pivotally mounted on said tractor, said first and second links being positioned to increase the wedging engagement between said locking arm and the lower portion of said clip when said links are moved toward a dead-center condition, said first link having a rigid extension thereon projecting in the direction of the second link when said toggle is in the dead-center position, said rigid extension providing a handle for operating said toggle and thus moving said locking arm in and out of engagement with said clip.

THEODORE J. CICERO.

REFERENCES CITED

The following references are of record in the file of this patent:

UNITED STATES PATENTS

| Number | Name | Date |
|---|---|---|
| 1,118,768 | Helgeson | Nov. 24, 1914 |
| 1,713,645 | Dayton | May 21, 1929 |
| 2,285,682 | Rhodes | June 9, 1942 |
| 2,326,533 | Greig | Aug. 10, 1943 |